Jan. 30, 1968 E. CAPELLARI 3,366,751

MULTIPOSITION ROTARY SELECTOR SWITCH

Filed June 7, 1966

United States Patent Office 3,366,751
Patented Jan. 30, 1968

3,366,751
MULTIPOSITION ROTARY SELECTOR SWITCH
Elio Capellari, Milan, Italy, assignor to Enrico Boselli S.p.A., Milan, Italy
Filed June 7, 1966, Ser. No. 555,744
Claims priority, application Italy, June 8, 1965, 12,878/65, Patent 767,775
5 Claims. (Cl. 200—11)

ABSTRACT OF THE DISCLOSURE

Signal generator consisting of disc with concentric annular arrangements of conductive and non-conductive elements on the side faces thereof and brushes to engage the side faces in radial alignment to pick off coded signals.

This invention relates to a multiposition rotary switch for the selective closing of contacts grouped according to a pre-established sequence on one or more printed circuits.

It is an object of this invention to provide a miniature rotary selector switch, for the closing of predetermined circuits in different rotational positions thereby to provide coded control pulses either in the decimal system, or in a binary code, as well as in a 2/5-code (two contacts closed and three contacts open), in the 2/6-, 2/7-, 2/8-codes, or even 3/6-, 3/7-, 3/8-codes, or in other suitable codes, which are more and more frequently utilized in the modern remote control-circuit technique.

More particularly, an object of the invention is to provide a rotary selector switch for the selective closing, controlled by given different circuits or circuit combinations, and through a given number of electric connections, in particular for the coded remote control of display apparatus or equipment and the like, said rotary selector switch comprising a rotatable disc which can be revolvingly positioned in any of a plurality of positions; there being provided as many sliding contacts as necessary for the required electric connections, and at least one printed circuit designed to cooperate with said contacts in order to obtain different combinations of circuits in said different positions, and wherein at least one printed circuit is formed on at least one side face of said disc, the said contacts being fastened onto a component of a stationary structure whereon same disc is revolvingly supported, said printed circuit being subdivided, at different distances from the rotation axis thereof, into concentric annular zones or portions, each corresponding to one of said contacts, said zones including conductive and non-conductive segments that extend circularly around the axis of rotation of said disc.

According to a particularly advantageous embodiment of the invention, two printed circuits are provided on opposite sides of the disc, and two pluralities of contacts are carried by the stationary components adjacent to and facing the same sides, the sum of contacts pertaining to said two pluralities being equal to the number of different electric connections to be established, and the annular zone having the smallest radius in each printed circuit, being made electrically conductive throughout its circular development, and electrically connected with the conductive segments of all other concentric zones having a greater radius, whereby differently combinable circuits can be closed through the contact or contacts individually following said annular zones and through those, amongst all contacts, which are simultaneously in contact with a conductive segment pertaining to any other of said annular zone outwardly to said smallest annular zone.

The rotary selector switch according to this invention is further characterized by a plurality of notches with which the disc outer edge is formed, the number of said notches corresponding to the number of selective positions wherein the selector switch can be rotated and stopped, and a flat spring being provided for engagement with anyone of said notches, whereby said disc is retained at each desired position of its several different switching positions.

The invention will be made apparent in the following, detailed description of a preferred embodiment thereof, as shown in the accompanying drawings, the description and drawings being given as a non-restrictive example only. In said drawings.

Figure 1:
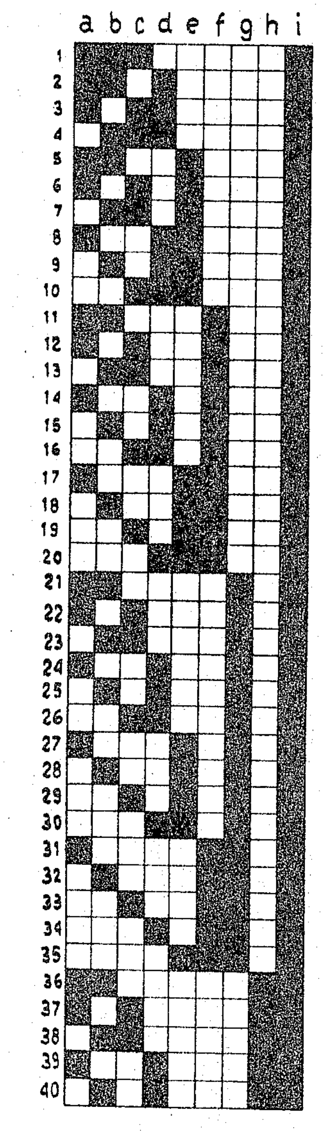
FIG. 1 is a diagram of a printed circuit including 40 positions and designed to provide 3/8 code combinations.
Figure 2:
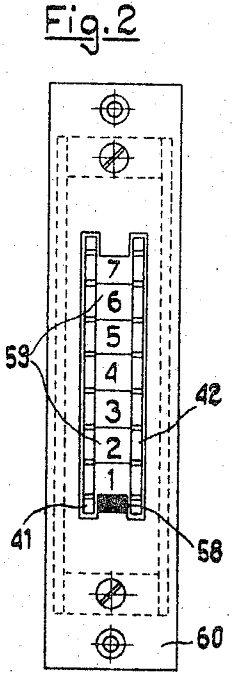
FIG. 2 is a front view of the selector switch.
Figure 3:
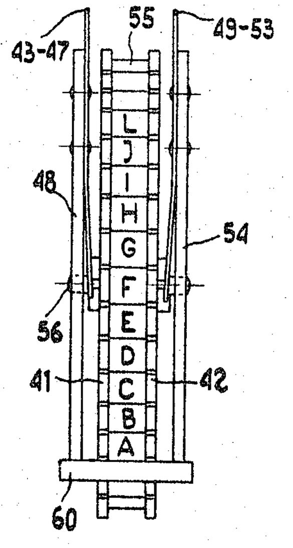
FIG. 3 is a plan view of said switch, wherein a few unessential details have been omitted, for simplicity.
Figure 4:
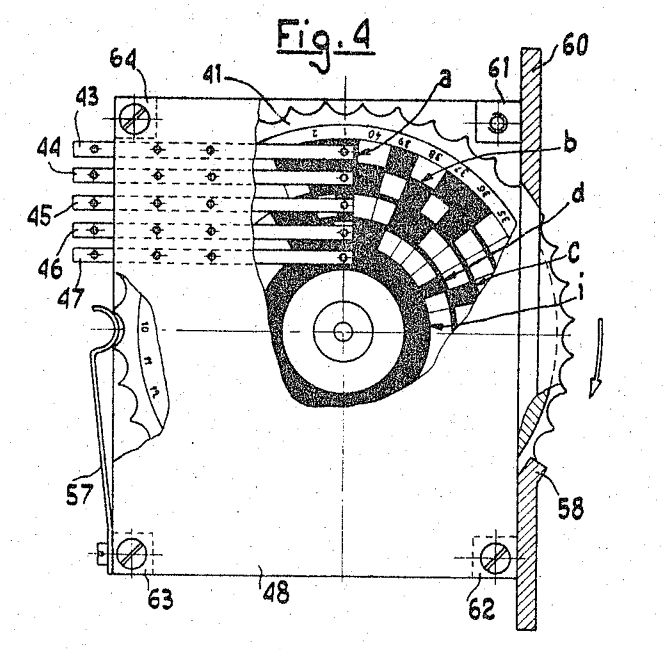
FIG. 4 is a side view of said switch, having part of the stationary structure broken away.

Referring now to the drawing, the forty positions that can be taken by the selector switch (as shown in FIGS. 2, 3 and 4) are indicated by the reference numerals 1 to 40 inclusive, while the contacts are assumed to be positioned to individually follow the nine sliding tracks *a–b–c–d–e–f–g–h–i*.

Said nine sliding tracks are provided by a corresponding printed circuit, and are provided on both discs 41 and 42, thus forming concentric rings, as partly shown in the FIG. 4. In more detail, the tracks *a–b–c–d–i* are arranged on the disc 41, while the tracks *e–f–g–h–i* are arranged on the disc 42. As shown in FIG. 4, stationary contacts carried by flat springs 43–44–45–46–47—insulated from each other and riveted to a stationary plate 48—are slidingly engaged with the tracks on disc 41, while the contacts carried by opposite flat springs 49–50–51–52–53—also insulated from each other and riveted to an opposite stationary plate 54—are slidingly engaged with the tracks on disc 42.

The contact carrying flat springs 47 and 53 which, through their related contacts, rest on the uninterrupted conductive contact tracks *i*, are short circuited with each other, and are designed to carry the voltage, having a certain polarity, from the input lead to the conductive segments of both printed circuits (blackened portions on the drawings).

The remaining eight flat springs (43–44, 45, 46, 49–50–51–52) to which the coded control leads are connected, may or may not have the same polarity as the input lead according to the position of the selector switch, and to the code in correspondence with which discs 41 and 42 are formed.

The discs 41 and 42 are fastened to each other and to a wheel 55, sandwiched between and having a diameter smaller than those of said discs, and that is rotatably fitted about a shaft 56. The disc outer edges are formed with forty semicircular notches, provided for manual positioning with the aid of the expressly shaped flat spring 57.

Forty numbers, or letters, or reference signs 59 are engraved on, or applied to wheel 55, in order to visualize the different positions at which the rotary assembly can be selectively set to provide the desired coded signal.

A red beak-like projection 58 that is formed on the front plate 60, serves as stop for the switch control finger, and as a reference index for the numeral or sign to be read.

The numerals or reference signs on wheel 55 shifted forward by as many steps as there are between the reading position 58, and the points of actual contact on the printed circuits.

Fast with posts 61 and 62 (that along with posts 63 and 64 serve to connect the two stationary insulating plates 48 and 54 with each other) is a centrally apertured front plate 60. A part of the outer edge of the discs 41 and 42 projects out of said aperture, for thumb operation of the selector.

A selector switch having outputs in a binary code, or in a 2/5-, 2/6- . . . code, or in any other code, can be realized in a wholly similar manner, by providing differing printed circuits on discs 41 and 42, having conductive and nonconductive portions and segments arranged as required.

While the invention has been described in detail with respect to a preferred embodiment thereof, it is to be understood that various changes and modifications may be made thereto without departing from the spirit and scope thereof.

What I claim is:

1. A coded-signal generator comprising support means, a manually operable member supported for rotation by said support means, said member having side faces inclusive of concentric annular rings of electrically conductive and non-conductive elements, the elements being related in radial alignments constituting different coded combinations, and brushes on said support means in correspondence with each of said rings to engage the radial alignments of elements selectively depending on the related position of said member whereby to provide for the generation of different coded signals.

2. A generator as claimed in claim 1, wherein the inner ring on each face consists exclusively of conductive elements and the brushes engaging the inner rings are connected together.

3. A generator as claimed in claim 2, wherein said member is a disc having a notched periphery with code indicia thereon, said generator including index means for cooperation with said indicia, which indica are shifted relative to said radial alignments to take into account the positioning of the index means.

4. A generator as claimed in claim 2, wherein said brushes are parallel leaf springs arranged in two coplanar groups on opposite sides of said member, said brushes having contacts in rectilinear alignment.

5. A generator as claimed in claim 4, wherein said support means includes side plates sandwiching said member therebetween and concealing said leaf springs.

References Cited

UNITED STATES PATENTS

| | | | |
|---|---|---|---|
| 3,121,142 | 2/1964 | Borutzke | 200—11 |
| 3,204,236 | 8/1965 | Duris et al. | 200—11 XR |
| 3,306,993 | 2/1967 | Lien | 200—11 |

FOREIGN PATENTS

| | | |
|---|---|---|
| 954,363 | 4/1964 | Australia. |

ROBERT K. SCHAEFER, *Primary Examiner.*

J. R. SCOTT, *Assistant Examiner.*